US012618705B2

(12) United States Patent
Im et al.

(10) Patent No.: US 12,618,705 B2
(45) Date of Patent: May 5, 2026

(54) METHOD AND APPARATUS FOR MEASURING LEVEL FOR CALCULATING FLOW OF PROPELLANT TANK

(71) Applicant: KOREA AEROSPACE RESEARCH INSTITUTE, Daejeon (KR)

(72) Inventors: Sung Hyuck Im, Daejeon (KR); Kee Joo Lee, Daejeon (KR); Jae Sung Park, Daejeon (KR)

(73) Assignee: KOREA AEROSPACE RESEARCH INSTITUTE, Daejeon (KR)

( * ) Notice: Subject to any disclaimer, the term of this patent is extended or adjusted under 35 U.S.C. 154(b) by 287 days.

(21) Appl. No.: 18/490,627

(22) Filed: Oct. 19, 2023

(65) Prior Publication Data

US 2025/0130091 A1     Apr. 24, 2025

(51) Int. Cl.
G01F 23/284      (2006.01)
G01F 23/80       (2022.01)

(52) U.S. Cl.
CPC .......... G01F 23/284 (2013.01); G01F 23/804 (2022.01)

(58) Field of Classification Search
CPC ............................. G01F 23/284; G01F 23/804
USPC ............................................. 73/290 R, 290 V
See application file for complete search history.

(56) References Cited

U.S. PATENT DOCUMENTS

| 6,987,481 B2 * | 1/2006 | Fehrenbach | ............ G01S 7/034 |
| | | | 73/290 R |
| 7,099,662 B2 * | 8/2006 | Fuenfgeld | ................. G01S 7/03 |
| | | | 73/290 R |
| 7,821,410 B2 * | 10/2010 | Higashionji | .......... G01F 23/802 |
| | | | 73/290 R |
| 2002/0040596 A1 * | 4/2002 | Muller | .................. G01F 23/284 |
| | | | 73/290 V |
| 2009/0314080 A1 * | 12/2009 | Qu | ...................... G01F 23/2966 |
| | | | 73/290 V |

FOREIGN PATENT DOCUMENTS

| CN | 114111964 A | 3/2022 |
| EP | 4155689 A1 | 3/2023 |
| JP | 2012132866 A | 7/2012 |
| JP | 2021140536 A | 9/2021 |
| KR | 20190018848 A | 2/2019 |
| KR | 102363929 B1 | 2/2022 |

* cited by examiner

*Primary Examiner* — Peter J Macchiarolo
*Assistant Examiner* — Rodney T Frank
(74) *Attorney, Agent, or Firm* — HOLZER PATEL DRENNAN

(57)          ABSTRACT

A method and apparatus for measuring a level for calculating a flow of a propellant tank are provided. The method of measuring a level for calculating a flow of a propellant tank includes, in response to an instruction to measure a level in a propellant tank storing a liquid fuel, generating propagated power for level measurement at a specified generation intensity inside the propellant tank through a transmission antenna, receiving the propagated power for level measurement passing through the liquid fuel through a reception antenna, calculating a degree of attenuation between the generation intensity and a reception intensity of the propagated power for level measurement, and measuring a height level of the liquid fuel by considering the degree of attenuation.

15 Claims, 6 Drawing Sheets

Reception antenna
220

201

202 h

Level
measurement
apparatus

100

Transmission
antenna
210

410

| | Measurement time | Height level | Degree of attenuation (Generation intensity – Reception intensity) | Transfer time (Generation timepoint – Reception timepoint) | Degree of latency (Transfer time difference) | Rate of flow | Consumption |
|---|---|---|---|---|---|---|---|
| 1 | 22.07.01 10:00 | 9m | 90 | 0.9seconds | - | 27tons | 3tons |
| 2 | 22.07.01 11:00 | 8m | 80 | 0.8seconds | 0.1 second reduced | 24tons | 6tons |

420

| | Measurement time | Height level h1 | Height level h2 | Height level h3 | Movement state of liquid fuel | Rate of flow | Acceleration of launch vehicle |
|---|---|---|---|---|---|---|---|
| 1 | 22.07.01 11:00 | 8m | 8m | 8m | Balanced state | 24 | 10 |
| 2 | 22.07.01 12:00 | 5m | 7m | 9m | Unbalanced state | 21 | 30 |

FIG. 4

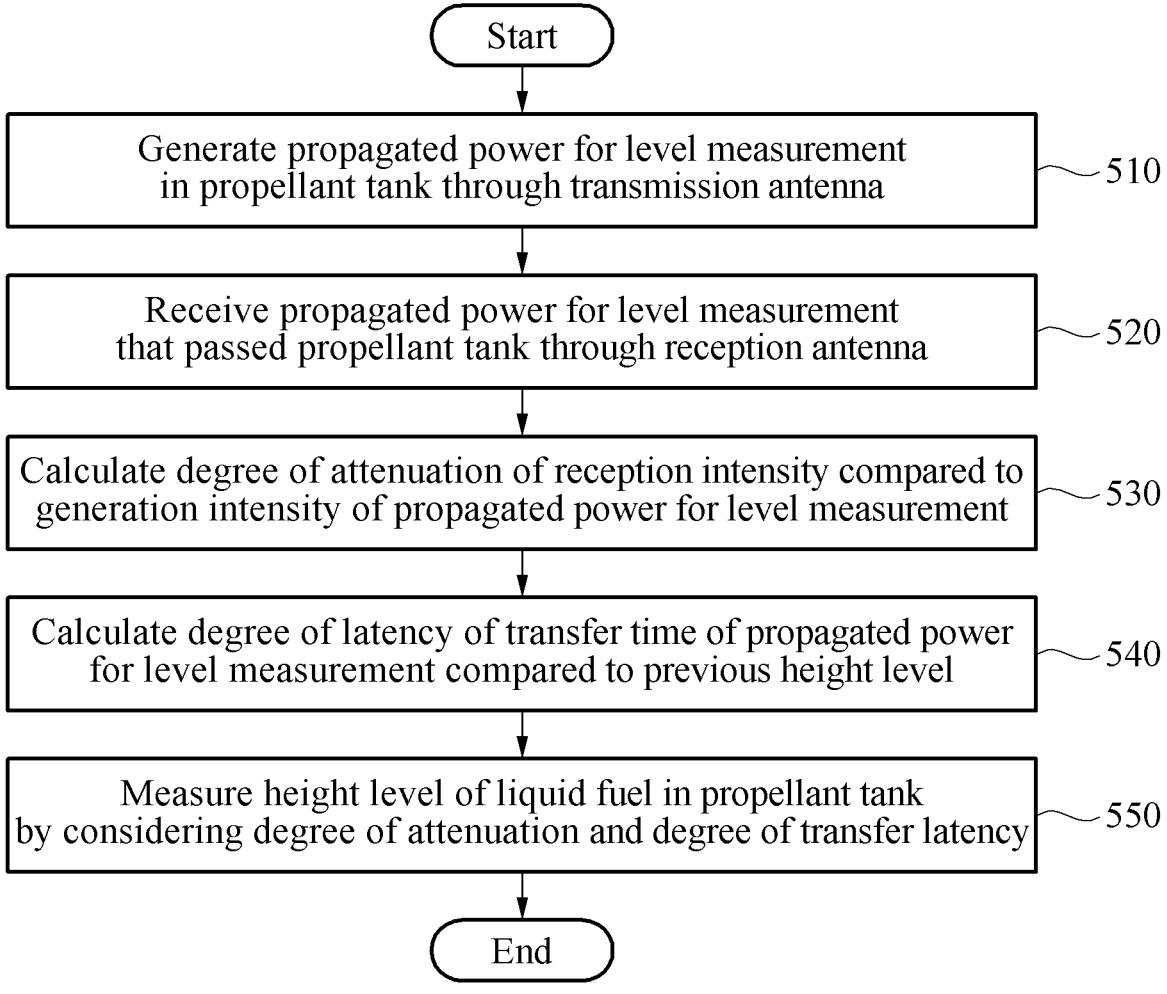

Start

Generate propagated power for level measurement
in propellant tank through transmission antenna                    510

Receive propagated power for level measurement
that passed propellant tank through reception antenna              520

Calculate degree of attenuation of reception intensity compared to
generation intensity of propagated power for level measurement    530

Calculate degree of latency of transfer time of propagated power
for level measurement compared to previous height level           540

Measure height level of liquid fuel in propellant tank
by considering degree of attenuation and degree of transfer latency  550

End

FIG. 5

METHOD AND APPARATUS FOR MEASURING LEVEL FOR CALCULATING FLOW OF PROPELLANT TANK

CROSS-REFERENCE TO RELATED APPLICATION

This application claims the benefit of Korean Patent Application No. 10-2022-0089528 filed on Jul. 20, 2022, in the Korean Intellectual Property Office, the entire disclosure of which is incorporated herein by reference for all purposes.

BACKGROUND

1. Field of the Invention

The present disclosure relates to a method of measuring a level of a liquid propellant in a propellant tank using a degree of attenuation of propagated power that is attenuated more when passing through a liquid than passing through gas.

2. Description of the Related Art

In general, a launch vehicle, such as a rocket or a satellite, may operate using a cryogenic medium as a propellant (a fuel), such as liquid oxygen, and may include a propellant tank formed of an aluminum material for storing the propellant. For the launch vehicle, measuring a level of a propellant tank may be important to identify consumption and movement of the propellant.

Conventionally, a method of measuring a level of a propellant tank through a temperature change using multiple thermometers or a method of measuring a level of a propellant tank through latency of a reflected ultrasonic wave or radio wave using an ultrasonic or radar level measurement instrument attached to an upper end of a tank may be used. However, the methods may impose high costs and may have limitations in durability and measurement accuracy.

Particularly, the level measurement method using an ultrasonic wave or radio wave may cause an error depending on movement of a liquid propellant and a level measurement instrument that is available for a cryogenic medium, such as liquid oxygen, may be restricted.

Accordingly, there is a demand for a height level measurement instrument that is available for a sensitive cryogenic medium with low cost by considering movement of a liquid propellant in response to movement of a launch vehicle.

SUMMARY

An embodiment of the present disclosure aims to accurately measure a height level of a liquid propellant in a simple method based on a degree of attenuation of propagated power passing through the liquid propellant in a tank, wherein the propagated power is generated inside a propellant tank.

An embodiment of the present disclosure aims to increase measurement accuracy of a height level of a liquid propellant by considering a degree of latency of a transfer time of propagated power passing through a liquid propellant in a tank together with the degree of attenuation.

An embodiment of the present disclosure aims to enable accurate level measurement and flow calculation while a launch vehicle moves by identifying movement of a liquid propellant in response to movement of the launch vehicle using a measured value of propagated power received by multiple points of a propellant tank through a plurality of reception antennas.

An embodiment of the present disclosure aims to miniaturize and produce a transmission antenna generating propagated power inside a tank by using broadband propagated power when measuring a level of a propellant tank, a reception antenna receiving propagated power passing through a liquid propellant in the tank, and a transceiver module controlling the transmission antenna and the reception antenna to be installed in a propellant tank provided in a small launch vehicle.

According to an aspect, there is provided a method of measuring a level for calculating a flow of a propellant tank including, in response to an instruction to measure a level in a propellant tank storing a liquid fuel, generating propagated power for level measurement at a specified generation intensity inside the propellant tank through a transmission antenna, receiving the propagated power for level measurement passing through the liquid fuel through a reception antenna, calculating a degree of attenuation between the generation intensity and a reception intensity of the propagated power for level measurement, and measuring a height level of the liquid fuel by considering the degree of attenuation.

In addition, there is provided an apparatus for measuring a level for calculating a flow of a propellant tank including, in response to an instruction to measure a level in a propellant tank storing a liquid fuel, a transmitter configured to generate propagated power for level measurement at a specified generation intensity inside the propellant tank through a transmission antenna, a receiver configured to receive the propagated power for level measurement passing through the liquid fuel through a reception antenna, a calculator configured to calculate a degree of attenuation between the generation intensity and a reception intensity of the propagated power for level measurement, and a measurement unit configured to measure a height level of the liquid fuel by considering the degree of attenuation.

According to the present disclosure, a height level of a liquid propellant may be accurately measured in a simple method based on a degree of attenuation of propagated power passing through the liquid propellant in a tank, wherein the propagated power is generated inside a propellant tank.

According to the present disclosure, measurement accuracy of a height level of a liquid propellant may increase by considering a degree of latency of a transfer time of propagated power passing through a liquid propellant in a tank together with the degree of attenuation.

According to the present disclosure, accurate level measurement and flow calculation while a launch vehicle moves may be enabled by identifying movement of a liquid propellant in response to movement of the launch vehicle using a measured value of propagated power received by multiple points of a propellant tank through a plurality of reception antennas.

According to the present disclosure, a transmission antenna generating propagated power inside a tank by using broadband propagated power when measuring a level of a propellant tank, a reception antenna receiving propagated power passing through a liquid propellant in the tank, and a transceiver module controlling the transmission antenna and the reception antenna may be miniaturized and produced to be installed in a propellant tank provided in a small launch vehicle.

According to the present disclosure, a flow and consumption of a liquid propellant may be accurately estimated by accurately identifying the movement of the liquid propellant based on height levels of multiple points by modeling a force applied to the liquid propellant in a propellant tank based on the acceleration of a launch vehicle in an atmospheric or space vacuum environment.

According to the present disclosure, the present disclosure may be used for leveling various industrial tanks using a sensitive liquid fuel in an extreme environment and a fuel tank for a vehicle as well as a propellant tank for a launch vehicle, such as a rocket and a satellite.

BRIEF DESCRIPTION OF THE DRAWINGS

These and/or other aspects, features, and advantages of the invention will become apparent and more readily appreciated from the following description of example embodiments, taken in conjunction with the accompanying drawings of which:

FIG. 4 is a diagram illustrating an example of a memory unit of a level measurement apparatus for calculating a flow of a propellant tank according to one embodiment of the present disclosure; and FIG. 5 is a flowchart illustrating a method of measuring a level for calculating a flow of a propellant tank according to one embodiment of the present disclosure.

DETAILED DESCRIPTION

Figure 1:
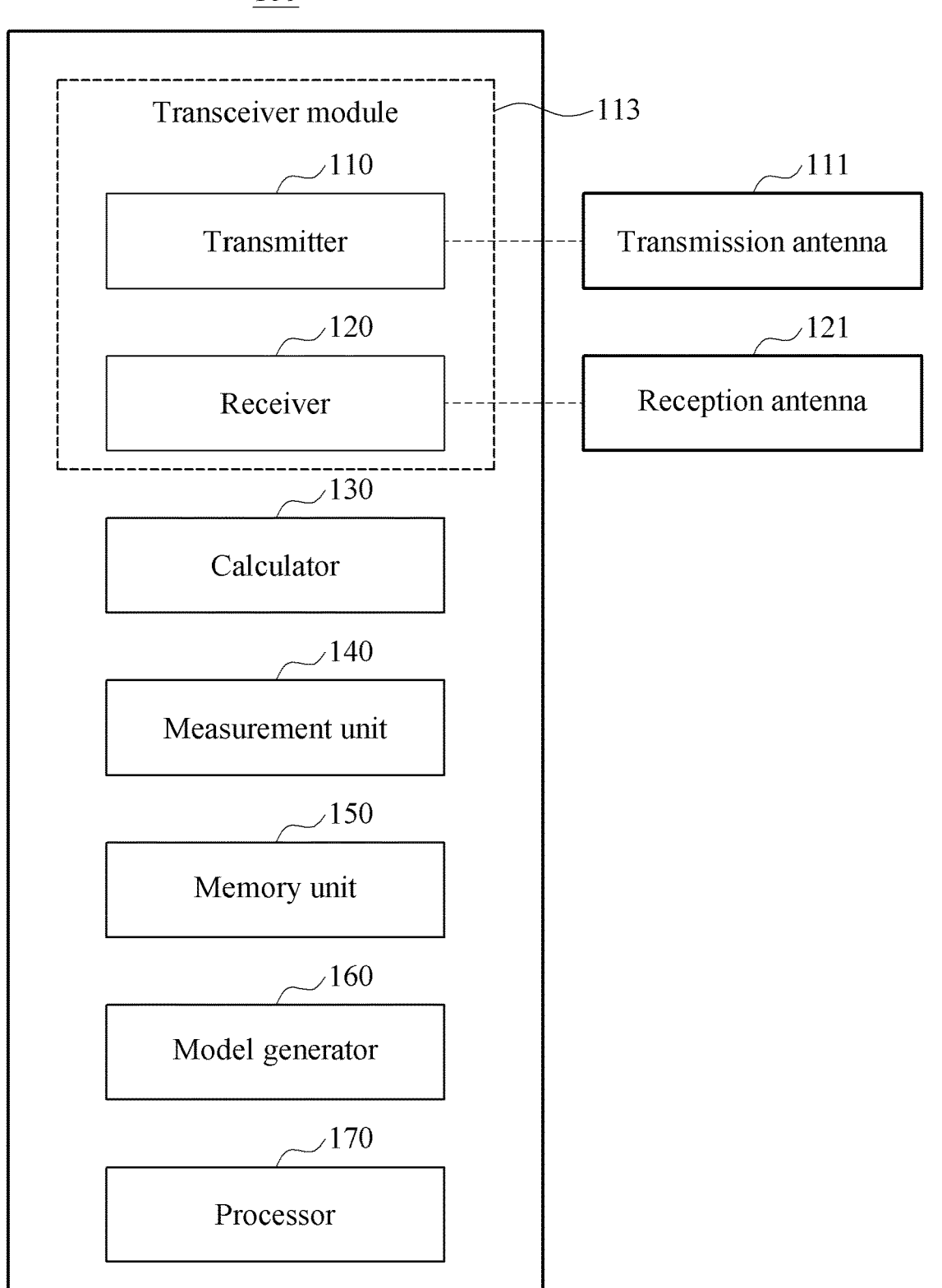
FIG. 1 is a block diagram illustrating a configuration of a level measurement apparatus for calculating a flow of a propellant tank according to the present disclosure.

Hereinafter, example embodiments will be described in detail with reference to the accompanying drawings. However, various alterations and modifications may be made to the embodiments. Here, the embodiments are not meant to be limited by the descriptions of the present disclosure. The embodiments should be understood to include all changes, equivalents, and replacements within the idea and the technical scope of the disclosure.

The terminology used herein is for the purpose of describing particular example embodiments only and is not to be limiting of the example embodiments. The singular forms "a", "an", and "the" are intended to include the plural forms as well, unless the context clearly indicates otherwise. It will be further understood that the terms "comprises/comprising" and/or "includes/including" when used herein, specify the presence of stated features, integers, steps, operations, elements, and/or components, but do not preclude the presence or addition of one or more other features, integers, steps, operations, elements, components and/or groups thereof.

Unless otherwise defined, all terms including technical and scientific terms used herein have the same meaning as commonly understood by one of ordinary skill in the art to which example embodiments belong. It will be further understood that terms, such as those defined in commonly-used dictionaries, should be interpreted as having a meaning that is consistent with their meaning in the context of the relevant art and will not be interpreted in an idealized or overly formal sense unless expressly so defined herein.

When describing the embodiments with reference to the accompanying drawings, like reference numerals refer to like constituent elements and a repeated description related thereto will be omitted. In the description of embodiments, detailed description of well-known related structures or functions will be omitted when it is deemed that such description will cause ambiguous interpretation of the present disclosure.

FIG. 1 is a block diagram illustrating an internal configuration of a level measurement apparatus for calculating a flow of a propellant tank according to one embodiment of the present disclosure.

Referring to FIG. 1, a level measurement apparatus 100 for calculating a flow of a propellant tank according to one embodiment of the present invention may include a transmission antenna 111, a reception antenna 112, a transmitter 110, a receiver 120, a calculator 130, and a measurement unit 140. In addition, according to one embodiment, the level measurement apparatus 100 may additionally include a memory unit 150, a model generator 160, and a processor 170.

In response to an instruction to measure a level of a propellant tank storing a liquid fuel, the transmitter 110 may generate propagated power for level measurement in a specified generation intensity inside a propellant tank through the transmission antenna 111.

The receiver 120 may receive the propagated power for level measurement that passes through the liquid fuel through the reception antenna 112.

Hereinafter, the transmitter 110 and the receiver 120 are described with reference to FIG. 2.

Figure 2:
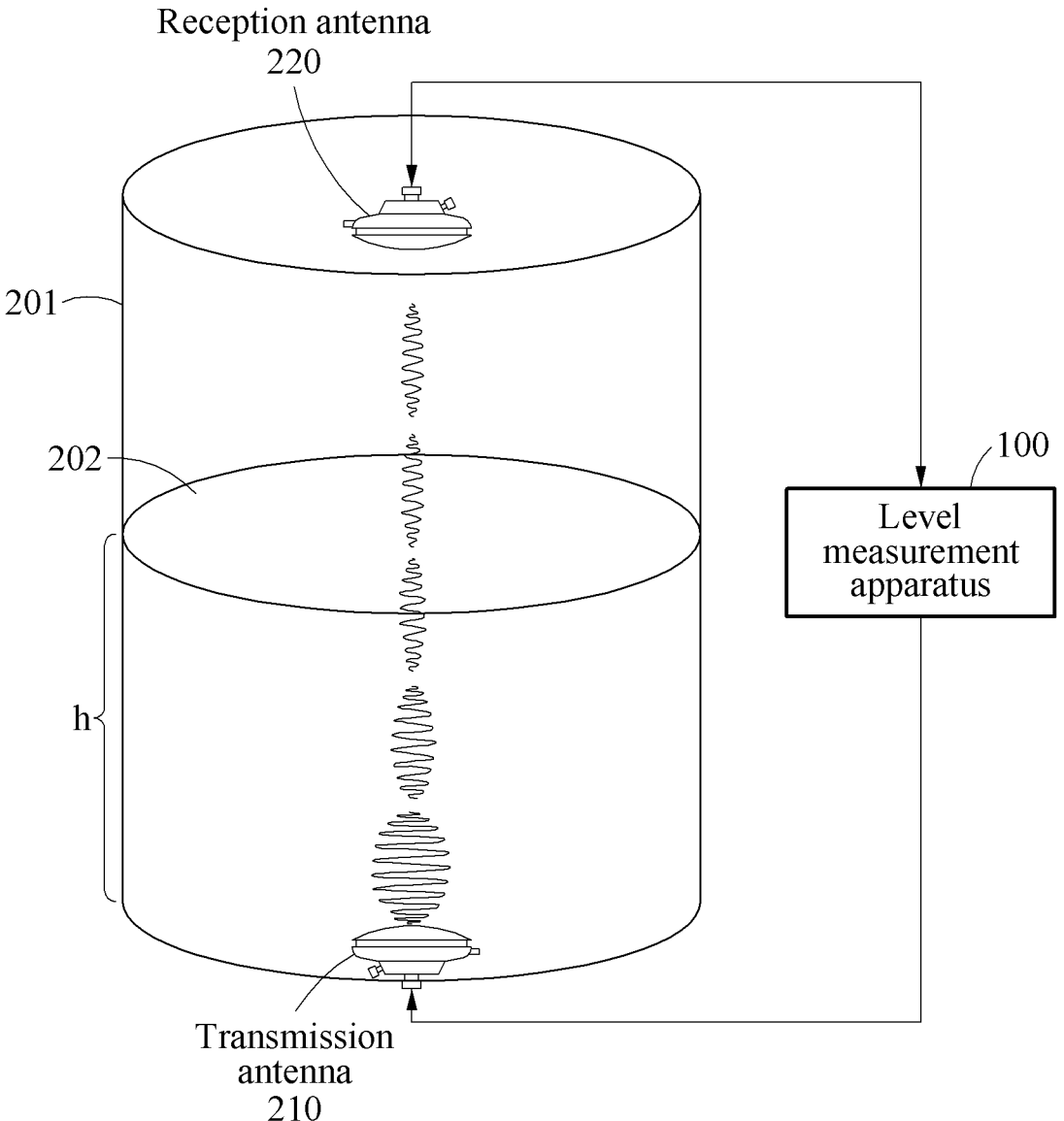
FIG. 2 is a diagram illustrating an example of measuring a height level using a single reception antenna of a level measurement apparatus for calculating a flow of a propellant tank according to the present disclosure.

FIG. 2 is a diagram illustrating an example of measuring a height level using a single reception antenna of a level measurement apparatus for calculating a flow of a propellant tank according to the present disclosure.

Referring to FIG. 2, one transmission antenna 111 or 210 generating propagated power for measuring a height level h may be attached to the center of a lower end of a propellant tank 201. The transmitter 110 may generate the propagated power for level measurement in a specified generation intensity (e.g., "100") inside the propellant tank 201 by controlling the transmission antenna 111 or 210.

In addition, a reception antenna 112 or 220 receiving the propagated power for measuring the height level h may be attached to the center of an upper end of the propellant tank 201. The receiver 120 may receive the propagated power for level measurement that passed a liquid fuel 202 in the propellant tank 201 by controlling the reception antenna 112 or 220.

In FIG. 2, while the propagated power for level measurement generated from the central point of the lower end of the propellant tank 201 to which the transmission antenna 111 or 210 is attached travels toward the reception antenna 112 or 220 at the central point of the upper end of the propellant tank 201 opposite thereto, the propagated power may pass a portion of the liquid fuel 202 in the propellant tank 201 and a portion of air that is not the liquid fuel 202, and during the process, the generation intensity (a signal intensity) of the propagated power for level measurement may be gradually attenuated due to the liquid fuel 202 and air.

Since the liquid fuel 202 used by a launch vehicle, such as a rocket or a satellite, is a cryogenic medium in a liquid state, such as liquid oxygen, the liquid fuel 202 may have characteristics of longer transfer time and greater attenuation than air in a gas state.

Accordingly, when the thickness of the liquid fuel 202 through which the propagated power for level measurement passes decreases and the thickness of air increases as the liquid fuel 202 in the propellant tank 201 is consumed, a degree of attenuation of the propagated power for level measurement may decrease and the transfer time may decrease.

On the other hand, when the thickness of the liquid fuel 202 increases and the thickness of air decreases as the liquid fuel 202 in the propellant tank 201 is filled, the degree of attenuation of the propagated power for level measurement may increase and the transfer time may increase.

Therefore, when measuring the height level h corresponding to the thickness of the liquid fuel 202, by using the degree of attenuation of the propagated power for level measurement and a degree of latency (a degree of reduction) of the transfer time, the height level may be measured with low cost, high durability, and high accuracy compared to a level measurement method using a temperature change by conventional multiple thermometers or latency of reflected ultrasonic or radio wave.

In the present disclosure, the propellant tank 201 may be formed of metal including an aluminum material and may prevent the propagated power for level measurement from being propagated to the outside of the tank. Accordingly, the propagated power for level measurement may not cause propagation interference with a control signal of a launch vehicle and may be used for height measurement in the tank.

In addition, the transmission antenna 111 and the reception antenna 112 in the present disclosure may be various antennas, such as a patch antenna and a plate-type antenna formed of metal, and when propagated power in a broadband is used as the propagated power for level measurement, the transmission antenna 111 and the reception antenna 112 may be miniaturized.

In addition, although the transmitter 110 and the receiver 120 may be implemented as separate modules and attached to the propellant tank in the present disclosure, by implementing the transmitter 110 and the receiver 120 as a single transceiver module 113 and miniaturizing the transceiver module 113, the transceiver module 113 may be installed in the propellant tank provided in a small launch vehicle. In this case, the transceiver module 113 may be used as a communication module configured to transmit the measured height level h to an external manager terminal.

The calculator 130 may calculate a degree of attenuation with the generation intensity and a reception intensity of the propagated power for level measurement.

For example, the calculator 130 may calculate a degree of attenuation in which a reception intensity of the propagated power for level measurement received through the reception antenna 112 is attenuated based on a generation intensity of the propagated power for level measurement generated through the transmission antenna 111.

For example, the calculator 130 may calculate a signal intensity of "10" as the degree of attenuation by subtracting a reception intensity of "90" of the propagated power for level measurement from a generation intensity of "100" of the propagated power for level measurement.

The measurement unit 140 may measure a height level of the liquid fuel by considering the degree of attenuation.

Hereinafter, the measurement unit 140 is described with reference to FIG. 4.

FIG. 4 is a diagram illustrating an example of a memory unit of a level measurement apparatus for calculating a flow of a propellant tank according to one embodiment of the present disclosure.

Referring to a memory unit 410 of FIG. 4, the measurement unit 140 may estimate that when a degree of attenuation is "90" based on a generation intensity (e.g., "100") of propagated power for level measurement at a measurement time (10:00, Jul. 1, 2022), a current height level is 9 m in a 10 m tank.

In addition, the measurement unit 140 may estimate that when the degree of attenuation is "80" based on a generation intensity (e.g., "100") of propagated power for level measurement at a next measurement time (11:00, Jul. 1, 2022), a liquid fuel in the propellant tank is more consumed and the height level is 8 m.

To measure the height level of the liquid fuel based on the degree of attenuation, for example, the measurement unit 140 may load a table recording a height value for each attenuation section from the memory unit 150, may extract a height level corresponding to the section in which the degree of attenuation is included, and may measure the height level as the height level of the liquid fuel.

The table may be provided in advance by analyzing iteratively collected attenuation amounts of the propagated power for level measurement and measured heights in a state in which at least one of level measurement conditions is determined, wherein the level measurement conditions may include a type of the liquid fuel, a metallic material forming the propellant tank, the size of the propellant tank, and a distance between attached points of the transmission antenna and the reception antenna in the propellant tank.

For example, the measurement unit 140 may predict and measure the height level of the liquid fuel based on the degree of attenuation using a deep learning-based height prediction model. For this, the level measurement apparatus 100 may further include a model generator 160.

The model generator 160 may generate a first height prediction model for the propellant tank by learning a first data set including an attenuation amount of the propagated power for level measurement and the measured height of the attenuation amount.

In this case, the measurement unit 140 may predict and measure the height level of the liquid fuel in the propellant tank based on an output value when inputting the degree of attenuation into the first height prediction model.

Depending on an embodiment, the level measurement apparatus 100 may further include the memory unit 150 configured to record a previous height level and a previous transfer time and the model generator 160.

The calculator 130 may calculate a transfer time from a timepoint when the propagated power for level measurement is generated to a timepoint of reception, and the measurement unit 140 may load, from the memory unit 150, a previous height level and a previous transfer time recorded in the memory unit 150, and may measure the height level by further considering the previous height level, the previous transfer time, and transfer latency based on a difference between the previous transfer time and the transfer time.

For example, referring to the memory unit 410 of FIG. 4, when the degree of attenuation is "80" based on a generation intensity (e.g., "100" of the propagated power for level measurement at a measurement time (11:00, Jul. 1, 2022) and a transfer time is 0.8 seconds, the measurement unit 140 may calculate a degree of transfer latency (0.1 seconds of reduction) based on a difference between a transfer time of 0.9 seconds of the propagated power for level measurement at a previous measurement time (10:00, Jul. 1, 2022) and may measure a height level by considering the degree of attenuation of "80" and the degree of transfer latency of "0.1 seconds of reduction". Through this, in the present embodiment, the measurement accuracy of the height level may increase by further considering a degree of latency or reduction of a transfer time compared to a case in which the height level is measured by considering only the degree of attenuation at a timepoint in which the liquid fuel of the propagated power for level measurement passes.

For example, the model generator 160 may generate a second height prediction model for the propellant tank by learning a second data set including transfer latency of the propagated power for level measurement, a measured height of the transfer latency, and a previously measured height.

In this case, the measurement unit 140 may predict and measure the height level of the liquid fuel in the propellant tank based on a combined value of an output value when the degree of attenuation is input to the first height prediction model and an output value when the degree of the transfer latency is input to the second height prediction model.

In this case, the first data set or the second data set may be collected when at least one of level measurement conditions is determined, wherein the level measurement conditions may include a type of the liquid fuel, a metallic material forming the propellant tank, the size of the propellant tank, and a distance between attached points of the transmission antenna and the reception antenna in the propellant tank. When any of the level measurement conditions change, the model generator 160 may modify a model through training a collected data set under the changed level measurement condition.

As described above, according to the present disclosure, depending on a degree of attenuation when propagated power generated in a propellant tank passes through a liquid propellant, a height level of the liquid propellant may be accurately measured at low cost in a simple method, and the accuracy of measuring the height level of the liquid propellant may increase by considering both the degree of attenuation and a degree of latency of a transfer time of the propagated power passing through the liquid propellant in the tank.

According to one embodiment, the level measurement apparatus 100 may further include the processor 170.

When the reception antennas 112 are distributed and attached to a plurality of points in the propellant tank and height levels are measured, by the measurement unit 140, for the plurality of points using reception intensities respectively received through the reception antennas 112, the processor 170 may determine that a movement state of the liquid fuel in the propellant tank is in a balanced state when a difference of the height levels measured for the plurality of points is within a reference value.

In addition, when the movement state is determined to be the balanced state, the processor 170 may calculate a flow of the liquid fuel in the propellant tank based on an average value of the height levels measured for the plurality of points and may estimate fuel consumption of a launch vehicle including the propellant tank based on the calculated flow.

Figure 3A:
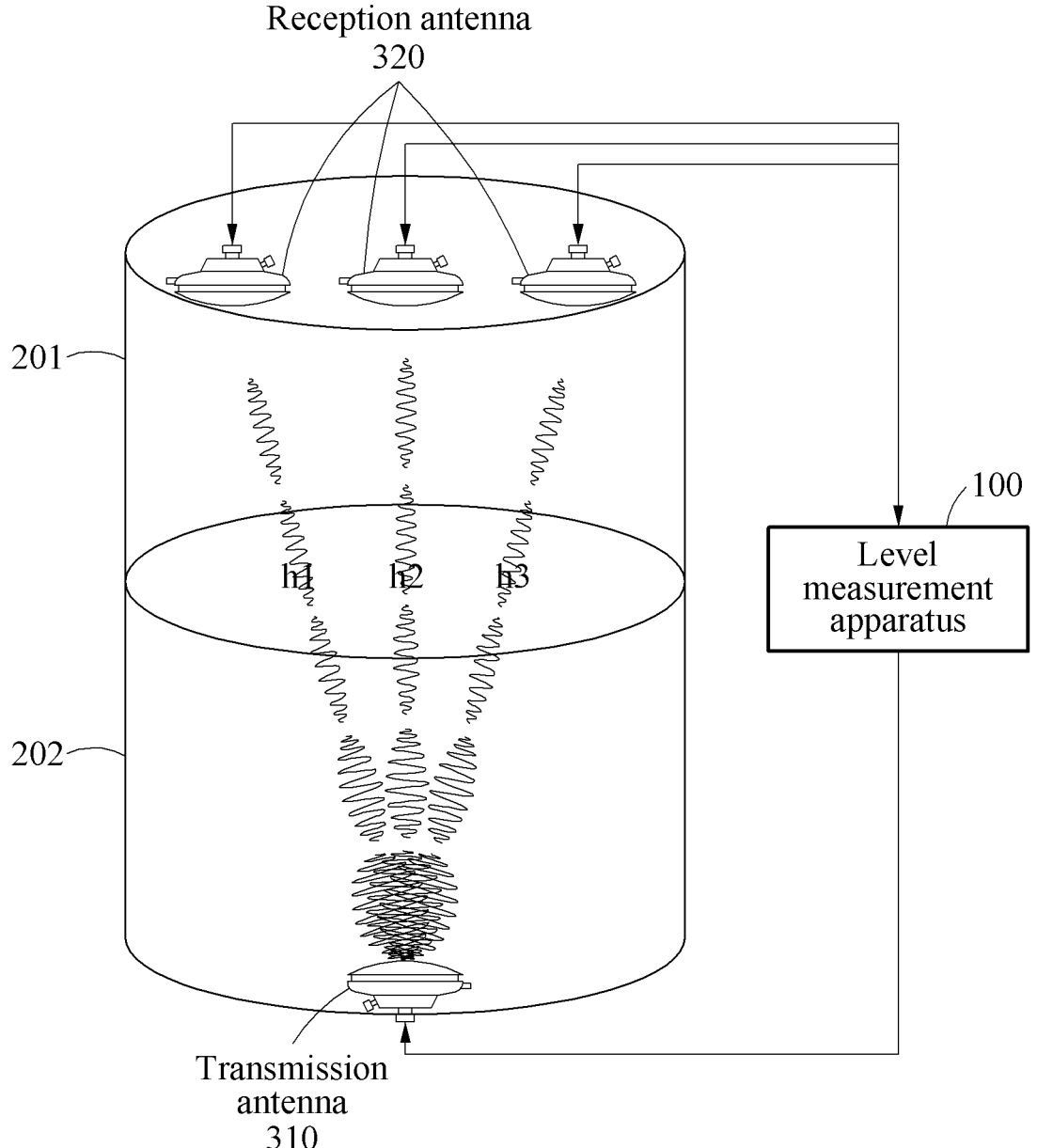
FIG. 3A is a diagram illustrating an example of measuring a height level using a plurality of reception antennas of a level measurement apparatus for calculating a flow of a propellant tank according to the present disclosure.

For example, referring to a memory unit 420 shown in FIG. 4, in the case of a measurement time (11:00, Jul. 1, 2022), since height levels h1, h2, and h3 measured by the measurement unit 140 are 8 m and a difference of the height levels is within a reference value, the processor 170 may determine that a movement state of a liquid fuel is in a balanced state as shown in FIG. 3A, may calculate a flow (24 tons) based on the height level (8 m), and may estimate fuel consumption (6 tons when the tank is 30 tons).

FIG. 3A is a diagram illustrating an example of measuring a height level using a plurality of reception antennas of a level measurement apparatus for calculating a flow of a propellant tank according to the present disclosure.

Referring to the propellant tank 201 shown in FIG. 3A, one transmission antenna 111 or 310 generating propagated power for level measurement may be attached to the center of a lower end of the propellant tank 201 and three reception antennas 112 or 320 receiving propagated power for level measurement passing through the liquid fuel 202 in the tank may be attached to the center of an upper end and both edges of the propellant tank 201.

In this case, the measurement unit 140 may measure a height level h1 of the liquid fuel 202 based on a degree of attenuation of the propagated power for level measurement received by the left reception antenna 320, may measure a height level h2 of the liquid fuel 202 based on a degree of attenuation of the propagated power for level measurement received by the middle reception antenna 320, and may measure a height level h3 of the liquid fuel 202 based on a degree of attenuation of the propagated power for level measurement received by the right reception antenna 320.

As described above, when the plurality of reception antennas 320 is attached to multiple points of the propellant tank 201 and a difference among the measured height levels h1, h2, and h3 is less than a reference value (e.g., h1=h2=h3), the processor 170 may determine that a movement state of the liquid fuel 202 is in a balanced state rather than in a tilted state.

When the movement state is determined to be in the balanced state, the processor 170 may calculate a flow of the liquid fuel 202 based on an average value h1 of the height levels measured at the multiple points and may estimate the fuel consumption of a launch vehicle including the propellant tank 201 based on the calculated flow.

Depending on embodiments, when the difference among the height levels measured at the multiple points exceeds the reference value, the processor 170 may determine that the movement state of the liquid fuel in the propellant tank is in an unbalanced state in response to the movement of the launch vehicle. When the movement state is determined to be in the unbalanced state, the processor 170 may predict and calculate a flow of the liquid fuel in the propellant tank using a flow prediction model.

Figure 3B:
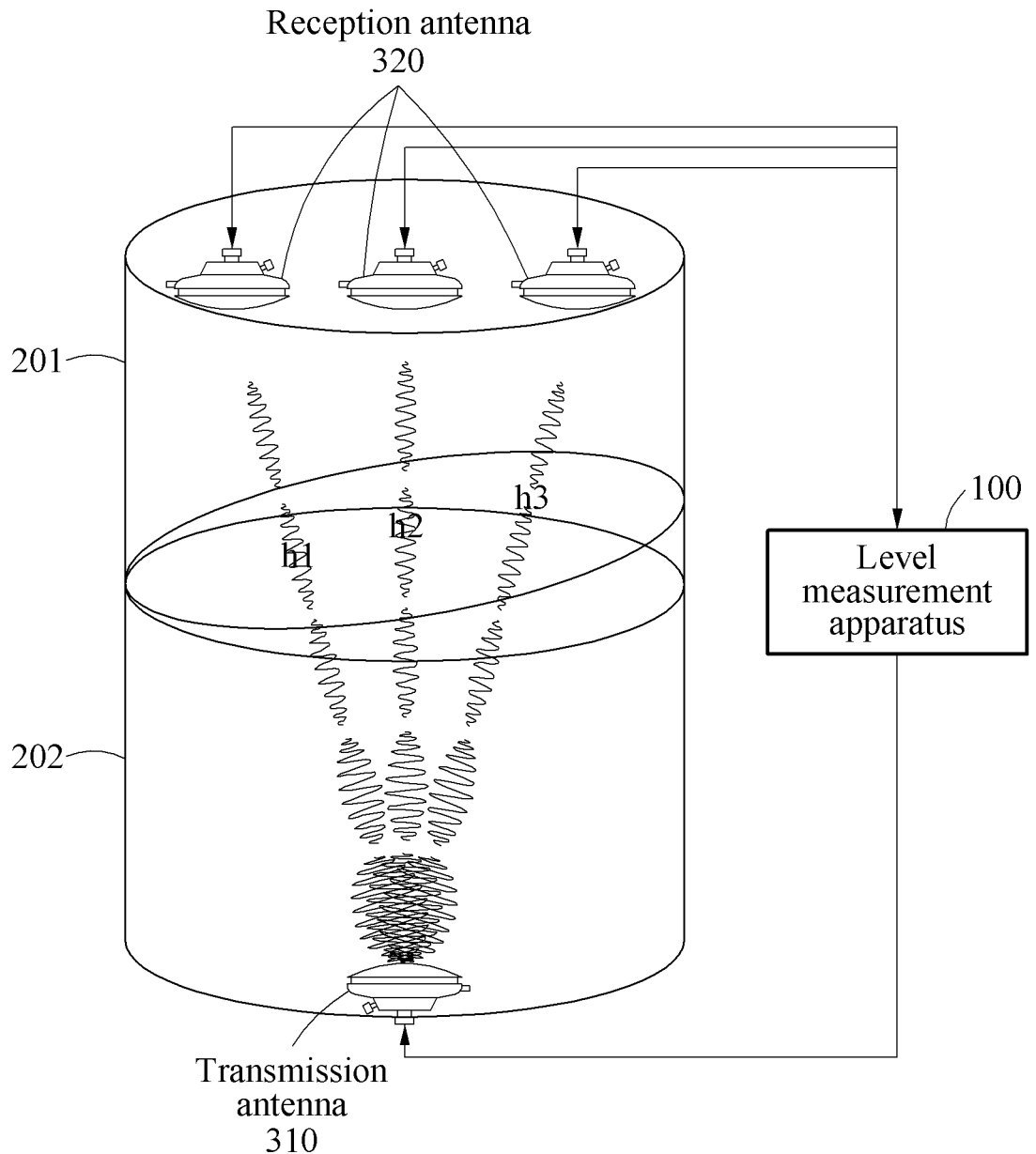
FIG. 3B is a diagram illustrating an example of determining a movement of a propellant when using a plurality of reception antennas of a level measurement apparatus for calculating a flow of a propellant tank.

For example, referring to the memory unit 420 shown in FIG. 4, at the measurement time (12:00, Jul. 1, 2022), since the height levels h1, h2, and h3 measured by the measurement unit 140 are respectively 5 m, 7 m, and 9 m, and a difference among the height levels is within a reference value (e.g., 50 cm), the processor 170 may determine that the movement state of the liquid fuel is in an unbalanced state in which the liquid fuel is tilted in one side as shown in FIG. 3B. In this case, the processor 170 may predict a flow (21 tons) corresponding to acceleration ("30") of the launch vehicle at the time and the measured height levels (5 m, 7 m, and 9 m) and may estimate fuel consumption (9 tons in the case of a 30-ton tank).

FIG. 3B is a diagram illustrating an example of determining a movement of a propellant when using a plurality of reception antennas of a level measurement apparatus for calculating a flow of a propellant tank.

Referring to FIG. 3B, the measurement unit 140 may measure height levels h1, h2, and h3 by attaching three reception antennas 320 to multiple points in the propellant tank 201, and when a difference among the height levels h1, h2, and h3 exceeds a reference value (e.g., h1<h2<h3), the processor 170 may determine that a movement state of the liquid fuel 202 is in an unbalanced state in which the movement of the liquid fuel 202 is tilted in a right side in the propellant tank 201 in response to the movement of the launch vehicle.

As described above, because a flow calculated by using the height levels h1, h2, and h3, which are measured when the liquid fuel 202 is tilted in one direction, may be inaccurate, the processor 170 may accurately estimate the flow and consumption of liquid propellant by modeling a force applied to the liquid propellant in the propellant tank based on the acceleration of the launch vehicle in an atmospheric or space vacuum environment.

For this, the model generator 160 may generate a flow prediction model by learning a third data set including the acceleration of the launch vehicle, the height levels of multiple points in the propellant tank, and the flow of the liquid fuel. The processor 170 may predict the flow of the liquid fuel based on an output value from the flow prediction model by inputting, into the flow prediction model, the height levels h1, h2, and h3 measured through three reception antennas 320 and the acceleration of the launch vehicle in the unbalanced state.

According to the present disclosure, accurate level measurement and flow calculation may be allowed while a launch vehicle moves by identifying the movement of liquid propellant as the launch vehicle moves by using measured values of propagated power received by multiple points in a propellant tank through a plurality of reception antennas.

In addition, according to the present disclosure, by modeling a force applied to the liquid propellant in the propellant tank based on the acceleration of the launch vehicle in an atmospheric or space vacuum environment, the flow and consumption of the liquid propellant may be accurately estimated by accurately identifying the movement of the liquid propellant based on the height levels of multiple points.

According to one embodiment, the level measurement apparatus 100 for calculating a flow of a propellant tank may generate (radiate) propagated power for level measurement to inside the propellant tank through the transmission antenna 111 and simultaneously may measure a height level of a liquid propellant (a liquid fuel) stored in the propellant tank using the single transceiver module 113 receiving the propagated power for level measurement that passed the liquid fuel in the propellant tank.

The transceiver module 113 may generate propagated power at a predetermined signal intensity toward inside the propellant tank through the transmission antenna 111 attached to the lower end of the propellant tank, and simultaneously may receive the propagated power that passed the liquid propellant (the liquid fuel) as a medium in the propellant tank through one or more reception antennas 112 attached to the upper end of the propellant tank opposite to the transmission antenna 111, may calculate signal attenuation for the propagated power by subtracting a signal intensity of the received propagated power from a signal intensity of the propagated power generated through the transmission antenna 111, may measure the height level of the propellant in the propellant tank based on a type of the propellant and the signal attenuation, and may transmit the measured height level to a manager terminal.

Accordingly, in the manager terminal, the flow (a remaining amount) of the propellant in the propellant tank at the time when the height level is measured by the transceiver module 113 may be accurately identified, and based on the calculated flow, fuel consumption of a device (a commercial tank or a moving vehicle, such as a launch vehicle or a vehicle) using the propellant tank as a fuel tank, and through this, an operating state and a remaining available time of the device may be identified, thereby, control performance of the device may be improved.

FIG. 5 is a flowchart illustrating a method of measuring a level for calculating a flow of a propellant tank according to one embodiment of the present disclosure.

The method of measuring a level for calculating a flow of a propellant tank according to one embodiment may be performed by the level measurement apparatus 100 described above.

Referring to FIG. 5, in operation 510, the level measurement apparatus 100 may generate propagated power for level measurement at a specified generation intensity inside a propellant tank storing a liquid fuel (a propellant) through a transmission antenna.

In operation 520, the level measurement apparatus 100 may receive, through a reception antenna, the propagated power for level measurement passing through the liquid fuel in the propellant tank.

In operation 530, the level measurement apparatus 100 may calculate a degree of attenuation of a reception intensity of the propagated power for level measurement compared to a generation intensity. That is, the level measurement apparatus 100 may calculate the degree of attenuation between the generation intensity and the reception intensity of the propagated power for level measurement.

In operation 540, the level measurement apparatus 100 may calculate a degree of latency of a transfer time of the propagated power for level measurement compared to a previous height level. That is, the level measurement apparatus 100 may calculate a transfer time from a timepoint when the propagated power for level measurement is generated to a timepoint when the propagated power for level measurement is received, and may calculate the degree of transfer latency based on a difference between the transfer time and a previous transfer time loaded from a memory unit.

In operation 550, the level measurement apparatus 100 may measure a height level of the liquid fuel in the propellant tank by considering the degree of attenuation in operation 530 and the degree of transfer latency and the previous height level in operation 540.

As described above, according to the present disclosure, the accuracy of measuring a height level of a liquid propellant may increase by considering a degree of attenuation when propagated power generated inside a propellant tank passes through the liquid propellant and a degree of latency of a transfer time of the propagated power passing through the liquid propellant in the tank.

In addition, accurate level measurement and flow calculation may be allowed while a launch vehicle moves by identifying the movement of liquid propellant as the launch vehicle moves by using measured values of propagated power received by multiple points in a propellant tank through a plurality of reception antennas.

The methods according to the above-described examples may be recorded in non-transitory computer-readable media including program instructions to implement various operations of the above-described examples. The media may also include, alone or in combination with the program instructions, data files, data structures, and the like. The program instructions recorded on the media may be those specially designed and constructed for the purposes of example embodiments, or they may be of the kind well-known and available to those having skill in the computer software arts. Examples of non-transitory computer-readable media include magnetic media such as hard disks, floppy disks, and magnetic tape, optical media such as CD-ROM discs, DVDs, and/or Blue-ray discs, magneto-optical media such as optical discs, and hardware devices that are specially configured to store and perform program instructions, such as read-only memory (ROM), random access memory (RAM), flash memory (e.g., USB flash drives, memory cards, memory sticks, etc.), and the like. Examples of program instructions include both machine code, such as produced by a compiler, and files containing higher-level code that may be executed by the computer using an interpreter. The above-described devices may be configured to act as one or more software modules in order to perform the operations of the above-described example embodiments, or vice versa.

The software may include a computer program, a piece of code, an instruction, or some combination thereof, to independently or collectively instruct or configure the processing device to operate as desired. Software and data may be embodied permanently or temporarily in any type of machine, component, physical or virtual equipment, or computer storage medium or device capable of providing instructions or data to or being interpreted by the processing device. The software also may be distributed over network-coupled computer systems so that the software is stored and executed in a distributed fashion. The software and data may be stored by one or more non-transitory computer-readable recording mediums.

A number of example embodiments have been described above. Nevertheless, it should be understood that various modifications may be made to these example embodiments. For example, suitable results may be achieved if the described techniques are performed in a different order and/or if components in a described system, architecture, device, or circuit are combined in a different manner and/or replaced or supplemented by other components or their equivalents.

Accordingly, other implementations are within the scope of the following claims.

What is claimed is:

1. A method of measuring a level for calculating a flow of a propellant tank, the method comprising:

in response to an instruction to measure a level in a propellant tank storing a liquid fuel, generating propagated power for level measurement at a specified generation intensity inside the propellant tank through a transmission antenna;

receiving the propagated power for level measurement passing through the liquid fuel through a reception antenna;

calculating a degree of attenuation between the generation intensity and a reception intensity of the propagated power for level measurement;

measuring a height level of the liquid fuel by considering the degree of attenuation;

when reception antennas are distributed and attached to multiple points of the propellant tank, measuring height levels of the multiple points using reception intensities respectively received through the reception antennas at the multiple points;

when a difference among measured heights of the multiple points is within a reference value, determining that a movement state of the liquid fuel in the propellant tank is in a balanced state;

when the movement state is determined to be the balanced state, calculating a flow of the liquid fuel in the propellant tank based on an average value of the measured height levels of the multiple points; and estimating fuel consumption of a launch vehicle comprising the propellant tank based on the calculated flow.

2. The method of claim 1, further comprising:

calculating a transfer time from a generation timepoint to a reception timepoint of the propagated power for level measurement;

loading a previous height level and a previous transfer time from a memory unit; and measuring the height level by further considering the previous height level and a degree of transfer latency based on a difference between the previous transfer time and the transfer time.

3. The method of claim 2, further comprising:

generating a first height level prediction model for the propellant tank through learning a first data set including an attenuation amount of the propagated power for level measurement and a measured height of the attenuation amount, wherein the measuring of the height level comprises:

predicting and measuring a height level of the liquid fuel in the propellant tank based on an output value obtained by inputting the degree of attenuation into the first height level prediction model.

4. The method of claim 3, further comprising:

generating a second height prediction model for the propellant tank through learning a second data set including transfer latency of the propagated power for level measurement, a measured height of the transfer latency, and a previously measured height, wherein the measuring of the height level further comprises:

predicting and measuring the height level of the liquid fuel in the propellant tank based on a combined value of an output value when the degree of attenuation is input to the first height prediction model and an output value when the degree of the transfer latency is input to the second height prediction model.

5. The method of claim 4, wherein the first data set or the second data set is collected when at least one of level measurement conditions is determined, wherein the level measurement conditions comprise a type of the liquid fuel, a metallic material forming the propellant tank, a size of the propellant tank, and a distance between attached points of the transmission antenna and the reception antenna in the propellant tank.

6. The method of claim 1, further comprising:

when a difference among measured heights of the multiple points exceeds the reference value, determining that a movement state of the liquid fuel in the propellant tank is in an unbalanced state in response to movement of the launch vehicle; and when the movement state is determined to be the unbalanced state, predicting and calculating a flow of the liquid fuel in the propellant tank using a flow prediction model.

7. The method of claim 6, further comprising:

generating the flow prediction model through learning a third data set comprising acceleration of the launch vehicle, the height levels of the multiple points in the propellant tank, and the flow of the liquid fuel.

8. A non-transitory computer-readable storage medium storing instructions that, when executed by a processor, cause the processor to perform a method comprising:

in response to an instruction to measure a level in a propellant tank storing a liquid fuel, generating propagated power for level measurement at a specified generation intensity inside the propellant tank through a transmission antenna;

receiving the propagated power for level measurement passing through the liquid fuel through a reception antenna;

calculating a degree of attenuation between the generation intensity and a reception intensity of the propagated power for level measurement;

measuring a height level of the liquid fuel by considering the degree of attenuation;

when reception antennas are distributed and attached to multiple points of the propellant tank, measuring height levels of the multiple points using reception intensities respectively received through the reception antennas at the multiple points;

when a difference among measured heights of the multiple points is within a reference value, determining that a movement state of the liquid fuel in the propellant tank is in a balanced state;

when the movement state is determined to be the balanced state, calculating a flow of the liquid fuel in the propellant tank based on an average value of the measured height levels of the multiple points; and estimating fuel consumption of a launch vehicle comprising the propellant tank based on the calculated flow.

9. An apparatus for measuring a level for calculating a flow of a propellant tank, the apparatus comprising:

a transmitter configured to generate, in response to an instruction to measure a level in a propellant tank storing a liquid fuel, propagated power for level measurement at a specified generation intensity inside the propellant tank through a transmission antenna;

a receiver configured to receive the propagated power for level measurement passing through the liquid fuel through a reception antenna;

a calculator configured to calculate a degree of attenuation between the generation intensity and a reception intensity of the propagated power for level measurement;

a measurement unit configured to measure a height level of the liquid fuel by considering the degree of attenuation; and a processor configured to:

when height levels are measured, by the measurement unit, for multiple points using reception intensities respectively received through reception antennas distributed and attached to the multiple points in the propellant tank, when a difference among measured heights of the multiple points is within a reference value, determine that a movement state of the liquid fuel in the propellant tank is in a balanced state, when the movement state is determined to be the balanced state, calculate a flow of the liquid fuel in the propellant tank based on an average value of the measured height levels of the multiple points, and estimate fuel consumption of a launch vehicle comprising the propellant tank based on the calculated flow.

10. The apparatus of claim 9, wherein the calculator is further configured to calculate a transfer time from a generation timepoint to a reception timepoint of the propagated power for level measurement, the measurement unit is further configured to:

load, from a memory unit, a previous height level and a previous transfer time recorded in the memory unit, and measure the height level by further considering the previous height level and a degree of transfer latency based on a difference between the previous transfer time and the transfer time.

11. The apparatus of claim 10, further comprising:

a model generator configured to generate a first height level prediction model for the propellant tank through learning a first data set including an attenuation amount of the propagated power for level measurement and a measured height of the attenuation amount, wherein the measurement unit is further configured to:

predict and measure a height level of the liquid fuel in the propellant tank based on an output value obtained by inputting the degree of attenuation into the first height level prediction model.

12. The apparatus of claim 11, wherein the model generator is further configured to:

generate a second height prediction model for the propellant tank through learning a second data set including transfer latency of the propagated power for level measurement, a measured height of the transfer latency, and a previously measured height, and the measurement unit is further configured to:

predict and measure the height level of the liquid fuel in the propellant tank based on a combined value of an output value when the degree of attenuation is input to the first height prediction model and an output value when the degree of the transfer latency is input to the second height prediction model.

13. The apparatus of claim 12, wherein the first data set or the second data set is collected when at least one of level measurement conditions is determined, wherein the level measurement conditions comprise a type of the liquid fuel, a metallic material forming the propellant tank, a size of the propellant tank, and a distance between attached points of the transmission antenna and the reception antenna in the propellant tank.

14. The apparatus of claim 9, wherein, when a difference among measured heights of the multiple points exceeds the reference value, the processor is further configured to:

determine that a movement state of the liquid fuel in the propellant tank is in an unbalanced state in response to movement of the launch vehicle, and when the movement state is determined to be the unbalanced state, predict and calculate a flow of the liquid fuel in the propellant tank using a flow prediction model.

15. The apparatus of claim 14, further comprising:

a model generator configured to generate the flow prediction model through learning a third data set comprising acceleration of the launch vehicle, the height levels of the multiple points in the propellant tank, and the flow of the liquid fuel.

* * * * *